United States Patent
Vasseur et al.

(10) Patent No.: US 8,824,334 B2
(45) Date of Patent: *Sep. 2, 2014

(54) DYNAMIC SHARED RISK NODE GROUP (SRNG) MEMBERSHIP DISCOVERY

(75) Inventors: Jean-Philippe Vasseur, Saint Martin dUriage (FR); Jim Guichard, New Boston, NH (US); Robert Marcin Raszuk, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 172 days.

This patent is subject to a terminal disclaimer.

(21) Appl. No.: 13/350,356

(22) Filed: Jan. 13, 2012

(65) Prior Publication Data
US 2012/0117252 A1    May 10, 2012

Related U.S. Application Data

(63) Continuation of application No. 11/101,134, filed on Apr. 7, 2005, now Pat. No. 8,228,786.

(51) Int. Cl.
*H04L 12/28* (2006.01)

(52) U.S. Cl.
USPC ............ 370/254; 709/227; 709/232; 709/238

(58) Field of Classification Search
USPC ...................................................... 370/219
See application file for complete search history.

(56) References Cited

U.S. PATENT DOCUMENTS

| | | | |
|---|---|---|---|
| 6,229,787 B1 * | 5/2001 | Byrne | 370/218 |
| 6,295,527 B1 | 9/2001 | McCormack et al. | |
| 6,553,423 B1 | 4/2003 | Chen | |
| 6,618,377 B1 | 9/2003 | Miriyala | |
| 6,856,591 B1 | 2/2005 | Ma et al. | |
| 6,882,627 B2 | 4/2005 | Pieda et al. | |
| 7,400,611 B2 * | 7/2008 | Mukherjee et al. | 370/338 |
| 7,535,828 B2 * | 5/2009 | Raszuk et al. | 370/219 |

(Continued)

FOREIGN PATENT DOCUMENTS

| | | |
|---|---|---|
| EP | 1701491 A1 | 9/2006 |
| EP | 06740325.3 | 2/2009 |

OTHER PUBLICATIONS

Callon, R., RFC 1195, entitled Use of OSI IS-IS for Routing in TCP/IP and Dual Environments, Dec. 1990, pp. 1-80.

(Continued)

*Primary Examiner* — Brian Roberts
*Assistant Examiner* — Abu-Sayeed Haque
(74) *Attorney, Agent, or Firm* — Novak Druce Connolly Bove + Quigg LLP

(57) ABSTRACT

In one embodiment, a network device determines identities of each peer device in a second routing domain attached to edge devices in a first routing domain. The network device associates each address prefix reachable in the second routing domain with an identity of each peer device in the second routing domain that advertised the address prefix and with an identity of one or more edge devices in the first routing domain to which that peer device is attached. The network device determines an address prefix is associated with a same identity of a peer device in the second routing domain but with different edge devices in the first routing domain. The network device assigns the different edge devices in the first routing domain associated with the determined address prefix to a shared risk node group (SRNG).

20 Claims, 5 Drawing Sheets

(56) References Cited

U.S. PATENT DOCUMENTS

| | | | |
|---|---|---|---|
| 2002/0191545 A1 | | 12/2002 | Pieda et al. |
| 2003/0233595 A1 | | 12/2003 | Charny et al. |
| 2005/0050225 A1 | * | 3/2005 | Tatman ........................ 709/244 |
| 2006/0164975 A1 | * | 7/2006 | Filsfils et al. ................ 370/225 |
| 2006/0209682 A1 | * | 9/2006 | Filsfils et al. ................ 370/219 |

OTHER PUBLICATIONS

Kompella, K., et al., IETF Internet Draft, entitled OSPF Extensions in Support of Generalized Multi-Protocol Label Switching (draft-ietf-ccamp-ospf-gmpls-extensions-12.txt), Oct. 2003, pp. 1-12.

Kompella, K., et al., IETF Internet Draft, entitled IS-IS Extensions in Support of Generalized Multi-Protocol Label Switching (draft-ietf-isis-gmpls-extensions-19.txt), Oct. 2003, pp. 1-12.

Moy, J., RFC 2328, entitled OSPF Version 2, Apr. 1998, pp. 1-204.

Perlman, R., Interconnections Second Edition: Bridges, Routers, Switches, and Internetworking Protocols, Chapter 9, Addison Wesley Longman, Inc., pp. 189-220.

Perlman, R., Interconnections Second Edition: Bridges, Routers, Switches, and Internetworking Protocols, Chapter 12, Addison Wesley Longman, Inc., pp. 299-324.

PCT Notification of Transmittal of the International Search Report and the Written Opinion of the International Searching Authority, or the Declaration, International Application No. PCT/US2006/012169, International Filing Date: Apr. 3, 2006, Date of Mailing: Oct. 31, 2007, 11 pages.

Rekhter, Y., et al., RFC 1771, entitled A Border Gateway Protocol 4 (BGP-4), Mar. 1995, pp. 1-54.

Rosen, E., et al., RFC 2547, entitled BGP/MPLS VPNs, Mar. 1999, pp. 1-24.

Sangli, S., et al., IETF Internet Draft, entitled BGP Extended Communities Attribute (draft-ietf-idr-bgp-ext-communities-08.txt, Feb. 2005, pp. 1-14.

Sangli, S., et al., "BGP Extended Communities Attribute", BGP, Mar. 2004.

Stephen A. T., IP Switching and Routing Essentials, Chapter 6, Wiley Computer Publishing, 2002, pp. 181-219.

Tanenbaum, A. S., Computer Networks; Fourth Edition, Section 1.4.2, Pearson Education, 2003, pp. 41-44.

\* cited by examiner

BGP TABLE 300

| PREFIX 310 | PEER-ROUTER ATTRIBUTE 320 | BGP NEXT-HOP ATTRIBUTE 330 | OTHER BGP ATTRIBUTES 340 |
|---|---|---|---|
| 10.1.1.1 | CE1 | PE1 | |
| 10.1.1.1 | CE1 | PE2 | |
| 10.1.1.1 | CE2 | PE2 | |
| ... | ... | ... | |

DYNAMIC SHARED RISK NODE GROUP (SRNG) MEMBERSHIP DISCOVERY

RELATED APPLICATIONS

This Application is a continuation of U.S. patent application Ser. No. 11/101,134, titled "Dynamic Shared Risk Node Group (SRNG) Membership Discovery" and filed on Apr. 7, 2005 by Jean-Philippe Vasseur et al., the contents of which are incorporated by reference herein in their entirety.

FIELD OF THE INVENTION

This invention relates generally to computer networks, and, more specifically, to a technique that enables a network node to automatically identify one or more shared risk node groups (SRNG) in a computer network.

BACKGROUND OF THE INVENTION

A computer network is a geographically distributed collection of interconnected subnetworks, such as local area networks (LAN) that transport data between network nodes. As used herein, a network node is any device adapted to send and/or receive data in the computer network. Thus, in this context, "node" and "device" may be used interchangeably. The network topology is defined by an arrangement of network nodes that communicate with one another, typically through one or more intermediate nodes, such as routers and switches. In addition to intra-network communications, data also may be exchanged between neighboring (i.e., adjacent) networks. To that end, "edge devices" located at the logical outer-bound of the computer network may be adapted to send and receive inter-network communications. Both inter-network and intra-network communications are typically effected by exchanging discrete packets of data according to predefined protocols. In this context, a protocol consists of a set of rules defining how network nodes interact with each other.

Each data packet typically comprises "payload" data prepended ("encapsulated") by at least one network header formatted in accordance with a network communication protocol. The network headers include information that enables network nodes to efficiently route the packet through the computer network. Often, a packet's network headers include a data-link (layer 2) header, an internetwork (layer 3) header and a transport (layer 4) header as defined by the Transmission Control Protocol/Internet Protocol (TCP/IP) Reference Model. The TCP/IP Reference Model is generally described in more detail in Section 1.4.2 of the reference book entitled *Computer Networks, Fourth Edition*, by Andrew Tanenbaum, published 2003, which is hereby incorporated by reference as though fully set forth herein.

A data packet may originate at a source node and subsequently "hop" from node to node along a logical data path until it reaches its addressed destination node. The network addresses defining the logical data path of a data flow are most often stored as Internet Protocol (IP) addresses in the packet's internetwork header. IP addresses are typically formatted in accordance with the IP Version 4 (IPv4) protocol, in which network nodes are addressed using 32 bit (four byte) values. Specifically, the IPv4 addresses are denoted by four numbers between 0 and 255, each number usually delineated by a "dot." A subnetwork may be assigned to an IP address space containing a predetermined range of IPv4 addresses. For example, an exemplary subnetwork may be allocated the address space 128.0.10.*, where the asterisk is a wildcard that can differentiate up to 254 individual nodes in the subnetwork (0 and 255 are reserved values). For instance, a first node in the subnetwork may be assigned to the IP address 128.0.10.1, whereas a second node may be assigned to the IP address 128.0.10.2.

A subnetwork is associated with a subnet mask that may be used to select a set of contiguous high-order bits from IP addresses within the subnetwork's allotted address space. A subnet mask length indicates the number of contiguous high-order bits selected by the subnet mask, and a subnet mask length of N bits is hereinafter represented as /N. The subnet mask length for a given subnetwork is typically selected based on the number of bits required to distinctly address nodes in that subnetwork. Subnet masks and their uses are more generally described in Chapter 9 of the reference book entitled *Interconnections Second Edition*, by Radia Perlman, published January 2000, which is hereby incorporated by reference as though fully set forth herein.

By way of example, assume an exemplary subnetwork is assigned the IP address space 128.0.10.4, and the subnetwork contains two addressable (reachable) network nodes. In this case, 30 address bits are needed to identify the subnetwork 128.0.10.4, and the remaining two address bits are used to distinctly address either of the two nodes in the subnetwork. Thus, the subnetwork may be associated with a subnet mask length of /30 since only the first 30 most-significant bits of an IP address are required to uniquely address this subnetwork. As used herein, an "address prefix" is defined as the result of applying a subnet mask to a network address. For example, consider the address prefix 128.0.10.1 /24. In this case, the network portion of the prefix contains the 24 most-significant bits of the IP address 128.0.10.1, i.e., the network is 128.0.10.0, and the last 8 bits are used to identify hosts on that network.

A computer network may contain smaller groups of one or more subnetworks which may be managed as separate routing domains. As used herein, a routing domain is broadly construed as a collection of interconnected network nodes under a common administration. Often, a routing domain is managed by a single administrative entity, such as a company, an academic institution or a branch of government. Such a centrally-managed routing domain is sometimes referred to as an "autonomous system" and is often associated with a unique autonomous system (AS) number that distinguishes the AS within a larger network environment. In general, a routing domain may operate as an enterprise network, a service provider or any other type of network or subnetwork. Further, the routing domain may contain one or more edge devices (e.g., border routers) having "peer" connections to other edge devices in adjacent routing domains.

Network nodes in a routing domain are typically configured to forward data using predetermined paths from "interior gateway" routing protocols, such as conventional link-state protocols and distance-vector protocols. These interior gateway protocols (IGP) define the manner with which routing information and network-topology information is exchanged and processed in the routing domain. For instance, IGP protocols typically provide a mechanism for distributing a set of reachable IP subnetworks (address prefixes) among the intermediate nodes in the routing domain. As such, each intermediate node receives a consistent "view" of the domain's topology. Link-state protocols, such as the Open Shortest Path First (OSPF) and Intermediate-System-to-Intermediate-System (IS-IS) protocols, and distance-vector protocols, such as the Routing Information Protocol (RIP), are generally described in Sections 12.1-12.3 of the reference book entitled *Intercon-*

*nections, Second Edition*, by Radia Perlman, published January 2000, which is hereby incorporated by reference as though fully set forth herein.

The Border Gateway Protocol (BGP) is usually employed as an "external gateway" routing protocol for routing data between autonomous systems. The BGP protocol is well known and generally described in Request for Comments (RFC) 1771, entitled *A Border Gateway Protocol 4 (BGP-4)*, by Y. Rekhter et al., published March 1995, which is publicly available through the Internet Engineering Task Force (IETF) and is hereby incorporated by reference in its entirety. External BGP (eBGP) is often used to exchange routing information across routing domain boundaries. Internal BGP (iBGP) is a variation of the eBGP protocol and is often used to distribute inter-network reachability information (address prefixes) among BGP-enabled edge devices situated within the same routing domain. To implement iBGP, the edge devices must be "fully meshed," i.e., such that every device is coupled to every other device by way of a TCP connection. In practice, conventional route reflectors are used to logically couple devices into a full mesh.

BGP-enabled edge devices perform various routing functions, including transmitting and receiving BGP messages and rendering routing decisions based on BGP routing policies. Each edge device maintains a local BGP routing table that lists feasible routes to reachable (i.e., accessible) network nodes. In the context of BGP, a "route" is defined as an address prefix and its associated path attributes. Periodic refreshing of the BGP routing table is generally not performed. However, the BGP-configured edge devices do exchange routing information under certain circumstances.

For example, when a BGP-enabled edge device initially connects to the network, the device identifies its directly-attached peers in neighboring ASes and then receives the entire contents of its peers' BGP routing tables. Thereafter, routing updates are incrementally disseminated among the interconnected BGP-enabled edge devices so that each device can construct a consistent view of the network topology. To that end, BGP update messages are typically used to advertise a list of address prefixes whose reachability information has changed in the BGP routing table. The BGP update message also may include one or more BGP attributes associated with the advertised prefixes. Conventional BGP attributes and their formats are generally well known and are described in more detail in Chapter 6 of the reference book entitled *IP Switching and Routing Essentials*, by Stephen A. Thomas, published 2002 which is hereby incorporated by reference in its entirety.

The concept of shared risk link groups (SRLG) has been introduced to reflect that failure of a single data link can result in failures at one or more other links. For instance, when different inter-domain data links share a common resource, such as an optical fiber or the like, they are said to participate in the same SRLG. That is, failure of the shared resource would result in the failures of each of the links whose data packets are transported using that shared resource. Similarly, when multiple edge devices in a first routing domain are attached to a common edge device in a second routing domain, the set of edge devices in the first domain may be members of the same shared risk node group (SRNG). In this case, a network failure at the common edge device would prevent each device in the SRNG from communicating with the failed edge device in the second domain.

SRLG membership information may be communicated among a set of fully-meshed edge devices using standardized extensions to conventional interior gateway routing protocols, such the OSPF and IS-IS protocols. In practice, a link is manually assigned, e.g., by a network administrator, to one or more SRLGs. The link is then associated with a different SRLG identifier for each of its assigned SRLGs. These identifiers are typically stored along with an identifier of the link in a type-length-value (TLV) tuple. Thereafter, the TLV is advertised within a routing domain to disseminate the link's SRLG information. For instance, SRLG TLVs for OSPF and IS-IS advertisements are respectively described in the IETF Internet Drafts draft-ietf-ccamp-ospf-gmpls-extensions-12.txt, entitled *OSPF Extensions in Support of Generalized Multi-Protocol Label Switching*, dated October 2003, by Kompella et al. and draft-ietf-isis-gmpls-extensions-19.txt, entitled *IS-IS Extensions in Support of Generalized Multi-Protocol Label Switching*, dated October 2003, by Kompella et al., both of which are hereby incorporated by reference as though fully set forth herein.

Although manual configuration of SRNG memberships also can be performed, such static SRNG configuration is impractical. For instance, manual SRNG configuration is excessively time consuming, since it requires a network administrator to examine each edge device in a routing domain to determine the device's directly-attached peers. Because the administrator may have to keep track of a large number of edge devices and complex network topologies, manual SRNG configuration can result in erroneous or accidental SRNG assignments. The above-noted problems are often compounded in response to changes in the network topology which necessitate updated SRNG assignments. For instance, if a link or node is added or removed at the edge of the routing domain, the network administrator may have to re-configure the SRNG memberships at least at those edge devices affected by the topology change.

It is therefore generally desirable to assign SRNG memberships to edge devices in a more efficient manner. The process of assigning SRNG memberships should be less time consuming and more reliable than manual configuration techniques, and the process should update SRNG memberships faster in response to network topology changes.

SUMMARY OF THE INVENTION

The present invention overcomes the disadvantages of the prior art by providing a technique for dynamically discovering SRNG memberships of a plurality of interconnected edge devices in a computer network. According to the technique, each edge device "learns" the identities of its directly-attached peer devices situated in neighboring routing domains, e.g., by establishing an interior or exterior gateway protocol session with each peer. Thereafter, each edge device advertises the identities of its learned peers to the other interconnected edge devices. Preferably, the peer identities are distributed in novel "peer-router" extended community attributes transported in BGP messages. After an edge device has learned the identity of its own peers and received the identities of the other edge devices' peers, the device can automatically detect SRNG memberships in the computer network. Specifically, edge devices that advertise the same peer are determined to participate in the same SRNG.

Advantageously, the inventive technique enables faster and more efficient identification of SRNG memberships than static configuration implementations. The technique also enables SRNG memberships to be updated faster and more efficiently in response to network topology changes.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 3 is a schematic block diagram of a BGP table that may store SRNG membership information in accordance with the illustrative embodiments;

DETAILED DESCRIPTION OF ILLUSTRATIVE EMBODIMENTS

Figure 1:
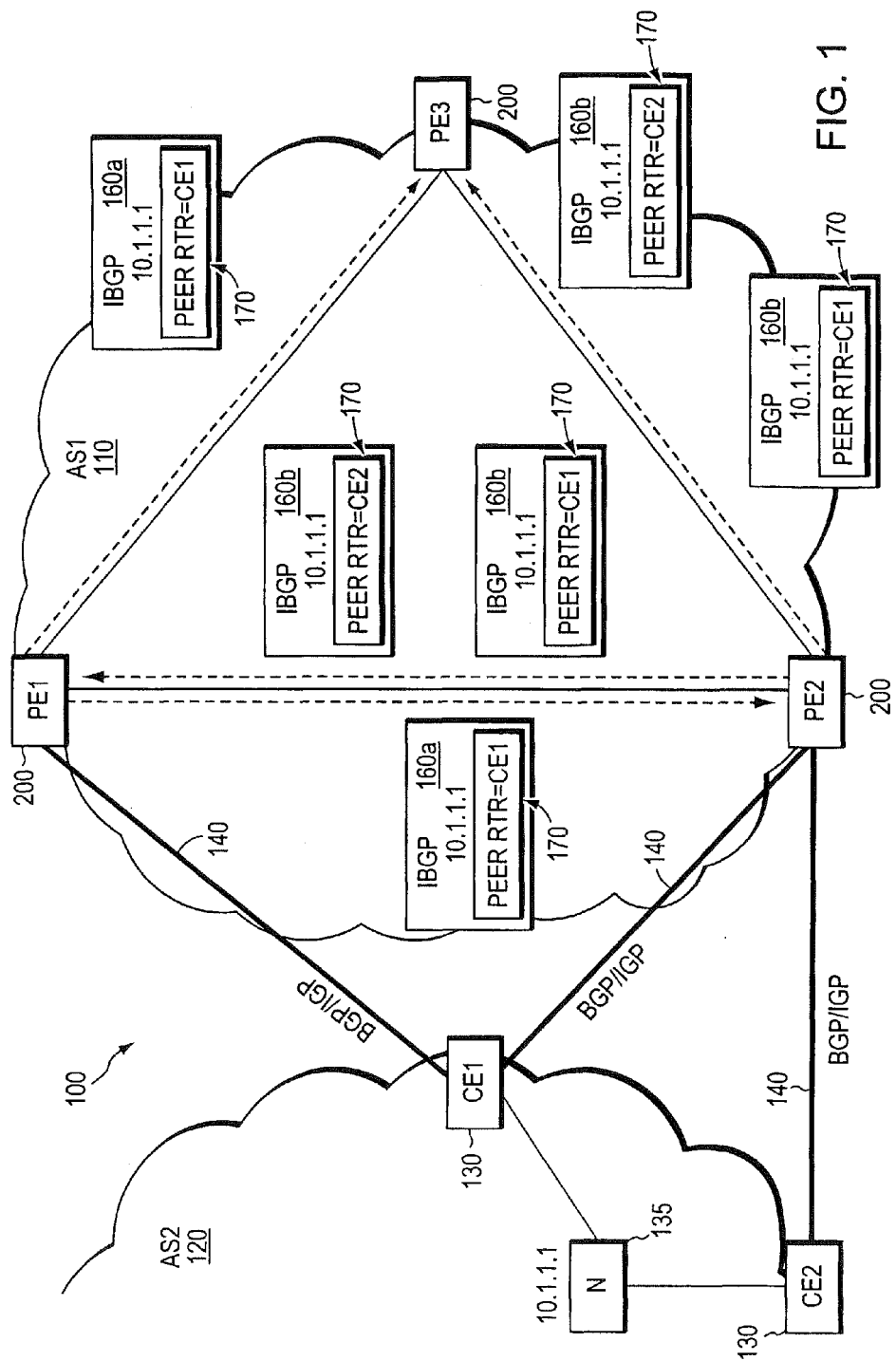
FIG. 1 is a schematic block diagram of an exemplary computer network that may be used in accordance with the illustrative embodiments. Those skilled in the art will appreciate that the network topology of FIG. 1 is merely representative and that the dynamic node-shared risk node group (SRNG) discovery technique of the present invention may be employed in other network topologies as well.

FIG. 1 illustrates an exemplary computer network 100 including a service provider network 110 (AS1) coupled to a neighboring customer site 120 (AS2). The provider network is preferably managed as BGP or Multi-Protocol Label Switching (MPLS) virtual private network (VPN) network, as generally described in the IETF publication RFC 2547, entitled *BGP/MPLS VPNs*, by E. Rosen et al., published March 1999, which publication is hereby incorporated by reference as though fully set forth herein. Data packets are forwarded between nodes in the provider network 110 using, e.g., the IP and/or MPLS protocols, and routing information is exchanged among the intermediate network nodes using an interior gateway routing protocol (IGP), such as OSPF or IS-IS.

The provider network 110 includes a plurality of provider edge (PE) devices 200, such as the edge devices PE1, PE2 and PE3. The PE devices are fully meshed at the BGP level. That is, each PE device in the provider network can communicate with every other PE device via iBGP (either directly, by means of BGP route reflectors or via use of confederations). The customer site 120 contains one or more customer edge (CE) devices 130 that communicate with the PE devices 200 over PE-CE data links 140. For example, as shown, the customer edge device CE1 is coupled to the provider edge devices PE1 and PE2, and the customer edge device CE2 is coupled to the provider edge device PE2. The PE and CE devices are generally intermediate network nodes, such as routers or switches, located at the edge of their respective networks.

The PE-CE data links 140 may be established over various physical mediums, such as conventional wire links, optical links, wireless links, etc., and may communicate data formatted using various network communication protocols including Asynchronous Transfer Mode (ATM), Frame Relay, Ethernet, Fibre Distributed Data Interface (FDDI), etc. In addition, the PE and CE devices may be configured to exchange routing information over their respective PE-CE data links using various interior and exterior gateway protocols, such as BGP, OSPF, IS-IS, etc.

In accordance with the illustrative embodiments, each PE device 200 dynamically "learns" the identities of its neighboring ("peer") CE devices 130. To that end, each pair of neighboring PE and CE devices typically establishes a reliable, stateful communication session, such as a TCP session, over its corresponding PE-CE data link 140. Routing information is then exchanged over the PE-CE link using, e.g., BGP or an appropriate IGP routing protocol. The choice of which routing protocol to deploy over the PE-CE data link may be locally determined by the pair of PE and CE devices attached to the link. Alternatively, the inter-domain routing protocol may be predetermined by, e.g., the network administrators of the provider network 110 and the customer site 120.

As is typical, after a BGP or IGP session has been established over a PE-CE data link, the CE device 130 attached to the link advertises its identity to the PE device 200 at the other end of the link. For instance, the CE device may communicate its identity in a "BGP Identifier" field of a BGP Open message sent to the PE device. When an IGP protocol is deployed over the PE-CE data link, an IGP Hello packet, such as a conventional OSPF or IS-IS Hello packet, may include a "Router ID" field or TLV containing the CE device's identity. The formats of BGP Open and IGP Hello messages are well known in the art and are described in more detail in the above-incorporated RFC 1771, and in the RFC 2328, entitled *OSPF Version 2*, by J. Moy, published April 1998, and in the RFC 1195, entitled *Use of OSI IS-IS for Routing in TCP/IP and Dual Environments*, by R. Callon, published December 1990, all of which are hereby incorporated by reference as though full set forth herein. Of course, besides the illustrative PE-CE routing protocols noted above, the teachings of the present invention are also applicable when other interior and exterior routing protocols, such as RIP or the Enhanced Interior Gateway Routing Protocol (EIGRP), etc., are executed over the PE-CE data links 140.

A CE device preferably identifies itself to an attached PE device using at least one of its assigned IP addresses, although those skilled in the art will understand that other identifying values also may be used. However, in accordance with the illustrative embodiments, each CE device advertises the same identifying value to each of its attached PE devices 200 in the provider network 110, even if the CE device communicates with two or more of its attached PE devices using different inter-domain routing protocols. For instance, in FIG. 1, CE1 sends the same CE-device identifier to both PE1 and PE2, even if CE1 is configured to communicate routing information over the PE1-CE1 data link using BGP and over the PE2-CE1 data link using an IGP protocol, such as OSPF.

After a PE device 200 learns the identities of its directly-attached CE devices 130, i.e., those CE devices that establish communication sessions directly with the PE device, the PE device advertises its learned CE-device identities to each of the other fully-meshed PE devices in the provider network 110. Specifically, the PE device generates an advertisement, such as an iBGP message 160, that associates a set of network layer reachability information (i.e., one or more address prefixes) with a corresponding CE device 130. Illustratively, each iBGP message 160 includes one or more prefixes and a "peer-router" extended community attribute 170 that identifies a CE device through which the prefixes can be reached. In general, the peer-router attribute may be formatted as a BGP extended community attribute, which is described in more detail in the IETF Internet Draft draft-ietf-idr-bgp-ext-communities-08.txt, entitled *BGP Extended Communities Attribute*, dated February 2005, by Sangli et al., which is hereby incorporated by reference in its entirety.

When a PE device 200 receives an iBGP message 160 from another one of the fully-meshed PE devices, the receiving PE device analyzes the message to locate any peer-router attributes 170 contained therein. Then, the PE device locates the CE-device identifiers stored in the received peer-router attributes and associates the CE identifiers with the set of address prefixes advertised in the iBGP message. For example, in the exemplary network 100, the customer edge devices CE1 and CE2 are attached to a network node N 135 whose network address is 10.1.1.1. Accordingly, CE1 and CE2 advertise the prefix 10.1.1.1 to each of their directly-attached provider edge devices. For instance, CE1 advertises the prefix to PE1 and PE2, and CE2 advertises the prefix to PE2.

After receiving the prefix from a neighboring CE device, a PE device 200 associates the received prefix with a CE identifier corresponding to the CE device 130 that advertised the prefix. The prefix and CE identifier are then disseminated within the provider network 110 to the other fully-meshed PE devices. For instance, PE1 disseminates iBGP messages 160a containing the address prefix 10.1.1.1 and a corresponding peer-router attribute 170 that identifies the customer edge device CE1. Similarly, PE2 propagates two different iBGP messages 160b containing the address prefix 10.1.1.1—one iBGP message 160b containing a peer-router attribute 170 identifying CE1, and another having a peer-router attribute identifying CE2. Each iBGP message 160 also includes a conventional BGP "next hop" attribute that identifies the sending PE device as a next-hop destination for traffic addressed to the prefix 10.1.1.1. For instance, each iBGP messages 160a includes a BGP next-hop attribute identifying PE1, whereas the BGP next-hop attributes in the iBGP messages 160b identify PE2.

After having learned the identity of its own peer CE devices and received the identities of each of the other PE devices' peers, e.g., from received peer-router and next-hop attributes, a PE device can automatically detect SRNG memberships in the provider network 110. Specifically, PE devices attached to the same CE device are determined to participate in the same SRNG. Because each PE device 200 advertises the identities of its peer CE devices to each of the other the fully-meshed PE devices, the PE devices 200 dynamically discover consistent sets of SRNG memberships.

Figure 2:
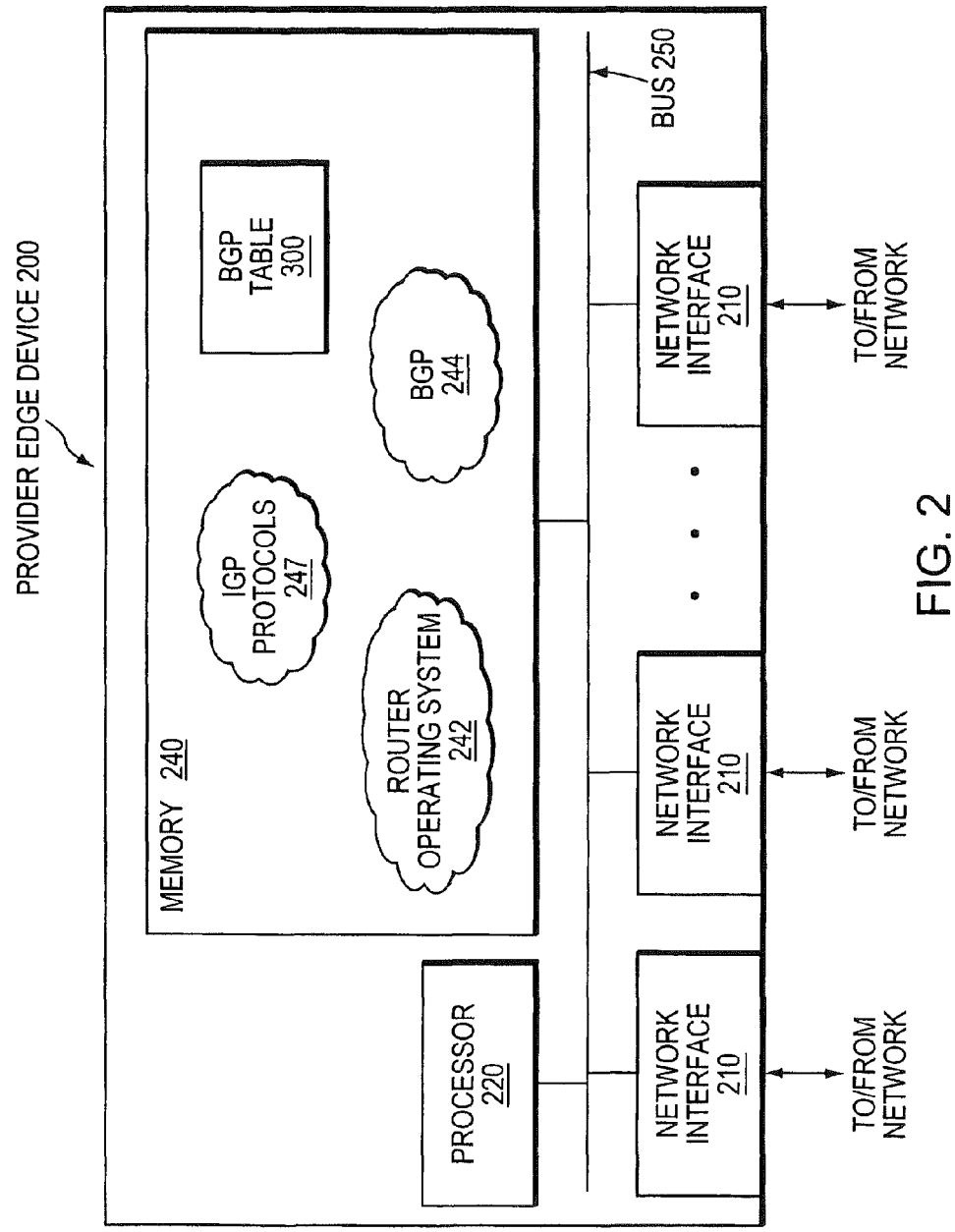
FIG. 2 is a schematic block diagram of a provider edge (PE) device which may implement the dynamic SRNG discovery technique in accordance with the illustrative embodiments.

FIG. 2 is a schematic block diagram of an exemplary PE device 200, such as a router, that may be advantageously used with the present invention. For ease of illustration and description, the PE device 200 is illustrated on a generic hardware platform. However, in alternative embodiments, the PE device may contain a plurality of line cards which are interconnected with a route processing engine through a switching fabric (i.e., backplane logic and circuitry). Accordingly, those skilled in the art will appreciate that the depicted PE device 200 is merely exemplary and that the advantages of the present invention may be realized on a variety of different hardware platforms having various software capabilities.

The PE device 200 comprises a plurality of network interfaces 210, a processor 220, and a memory 240 interconnected by a system bus 250. The network interfaces 210 contain the mechanical, electrical and signaling logic and circuitry for communicating data over physical links coupled to the network 100. The network interfaces may be configured to transmit and/or receive data using a variety of different communication protocols, including, inter alia, TCP/IP, ATM, User Datagram Protocol (UDP), synchronous optical networks (SONET), synchronous digital hierarchy (SDH), wireless protocols, Frame Relay, Ethernet, Fiber Distributed Data Interface (FDDI), etc.

The memory 240 comprises a plurality of storage locations, which are addressable by the processor 220 and the network interfaces 210, and are adapted to store program code and data structures associated with the present invention. The processor 220 comprises circuitry and logic adapted to execute the program code and manipulate the data structures. The memory 240 preferably comprises a form of random access memory (RAM) that is generally cleared by a power cycle or other reboot operation (e.g., it is a "volatile" memory). It will be apparent to those skilled in the art that the memory 240 also may comprise other memory means, including various computer-readable media, for storing program instructions and data structures pertaining to the operation of the PE device 200. Further, those skilled in the art will appreciate that at least some portions of the memory 240 may be embodied as electromagnetic signals that are transmitted from a remote memory element to the PE device 200.

The memory 240 stores, among other things, computer-readable instructions for implementing a routing operating system 242 that functionally organizes the PE device 200 by, inter alia, invoking network operations in support of software processes and services executing in the PE device 200. The IOS™ operating system by Cisco Systems Incorporated is one example of such a routing operating system 242. The software processes and services supported by the routing operating system include IGP protocols 247 and a BGP process 244.

The IGP protocols 247 include computer-executable instructions that enable the processor 220 to implement functions provided by one or more routing protocols, such as OSPF and IS-IS. These protocols may be configured to manage routing and forwarding information databases (not shown) containing, e.g., data used to make routing and forwarding decisions. The BGP process 244 includes computer-executable instructions for executing the BGP protocol, i.e., iBGP and/or eBGP. The BGP process manages the contents of a BGP routing table 300 which lists feasible routes to reachable (i.e., accessible) network nodes. In the context of BGP, a "route" is defined as an address prefix and its associated path attributes.

FIG. 3 illustrates an exemplary BGP table 300 that may be stored in the memory 240. Each table entry 305 contains an address prefix 310, a peer-router attribute 320, a BGP next-hop attribute 330 and other BGP attributes 340. The address prefix 310 may be, e.g., an IPv4 or VPNv4 address prefix that is reachable to the PE device 200. The peer-router attribute 320 identifies a CE device associated with the prefix 310. The BGP next-hop attribute 330 identifies a PE device that may be used as a next hop to reach the CE device identified by the peer-router attribute 320. Accordingly, a SRNG can be identified in the table 300 when a prefix 310 is associated with the same CE device 320 but different PE devices 330. The other BGP attributes 340 may include other BGP path attributes, such as the BGP origin attribute, AS_path attribute, local_pref attribute, etc., as conventionally known in the art.

Operationally, an iBGP message 160 containing network layer reachability information (nlri) and a corresponding peer-router attribute 170 is received at a network interface 210 of the PE device 200. The message is passed to the BGP process 244 which locates a CE identifier in the received peer-router attribute 170, and also locates a PE identifier in the message's next-hop attribute. For each address prefix advertised in the received nlri, the BGP process respectively stores the received CE and PE identifiers as the peer-router attribute 320 and BGP next-hop attribute 330 in the prefix's table entry 305. SRNGs may be identified by traversing the BGP table entries 305 and locating groups of PE devices associated with the same prefix 310 and CE device 320. For instance, in the exemplary BGP table 300, PE1 and PE2 are members of the same SRNG since they both are BGP next-hops for the prefix 10.1.1.1 advertised by the customer edge device CE1.

Figure 4:
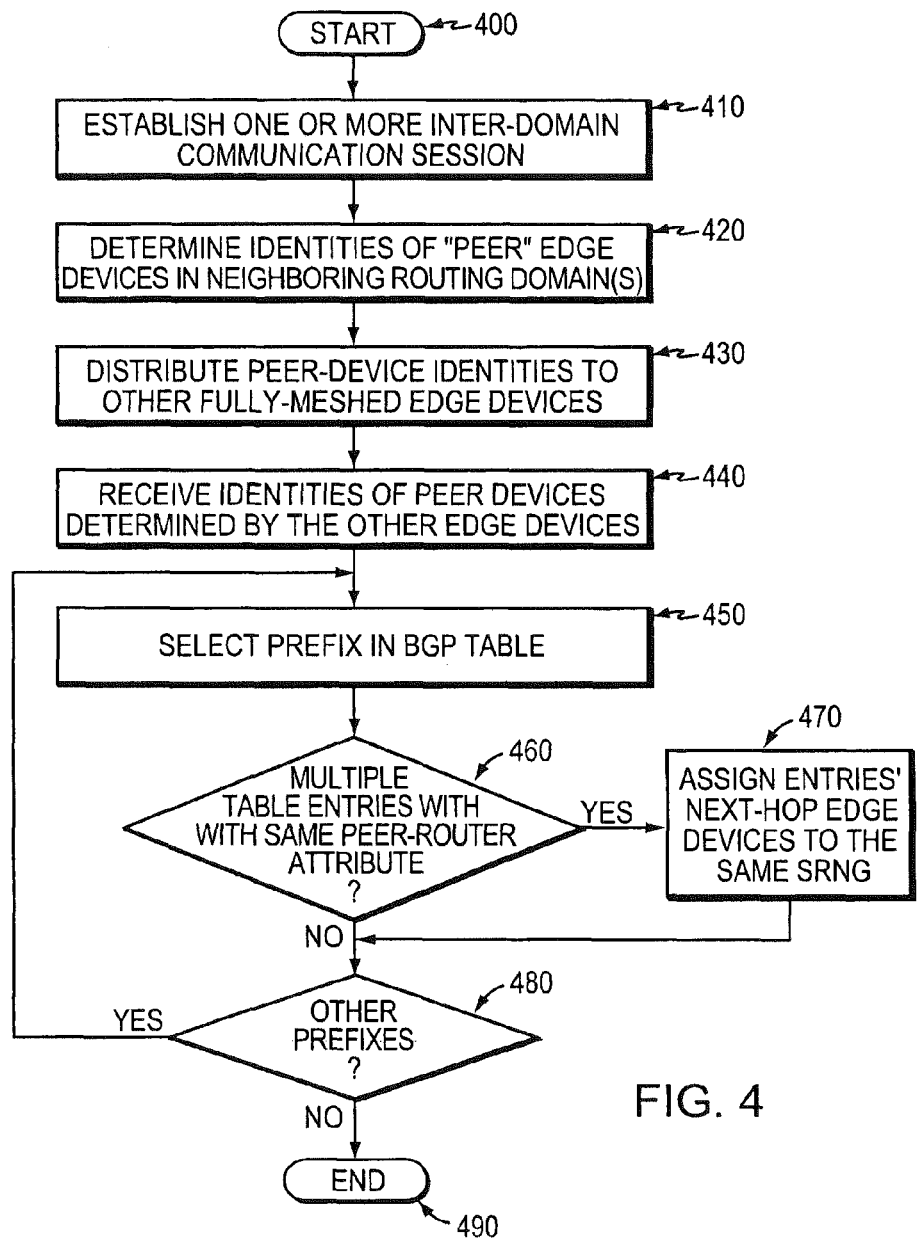
FIG. 4 is a flowchart illustrating a sequence of steps for dynamically identifying SRNG memberships in accordance with the illustrative embodiments.

FIG. 4 illustrates a sequence of steps that may be performed by a PE device 200 that dynamically discovers SRNG memberships in accordance with the illustrative embodiments. The sequence starts at step 400 and proceeds to step 410 where the PE device establishes one or more inter-domain communication sessions, e.g., BGP or IGP sessions, with its directly-attached "peer" CE devices 130. At step 420, the PE device determines the identities of its peer CE devices, e.g., based on the contents of BGP Open messages or IGP Hello messages received from the peers. Then, at step 430, the PE device distributes the identities of its peer CE devices to the other fully-meshed PE devices in the provider network 110. To that end, the CE device identities may be advertised to the other PE devices in one or more iBGP messages 160, each iBGP message containing a peer-router extended community attribute 170 storing a CE device identity and a BGP next-hop attribute identifying the PE device.

At step 440, the PE device 200 receives the identities of the CE devices coupled to the other PE devices. That is, the PE device may receive iBGP messages 160 advertised from the other fully-meshed PE devices, and may extract CE identifiers from peer-router attributes 170 included in the received iBGP messages. Illustratively, the PE device stores its locally-determined CE-device identifiers as well as the CE-device identifiers received from the other PE devices in a BGP table 300. As noted, each entry 305 in the BGP table associates a reachable address prefix 310 with a CE device 320 that advertised the prefix and with a PE device 330 attached to the advertising CE device 320.

Next, at steps 450-480, the PE device "walks" the BGP table 300 to automatically detect SRNG memberships. First, at step 450, an address prefix 310 is selected in the BGP table 300. Table entries 305 containing the selected prefix are examined, at step 460, to determine whether multiple table entries containing the prefix also store the same peer-router attribute 320. If so, then at step 470, edge devices identified by the entries' next-hop attributes 330 are determined to belong to the same SRNG. At step 480, the BGP table is examined to determine whether it contains any other reachable prefixes. If it does, the sequence returns to step 450. Otherwise, the sequence ends at step 490.

Figure 5:
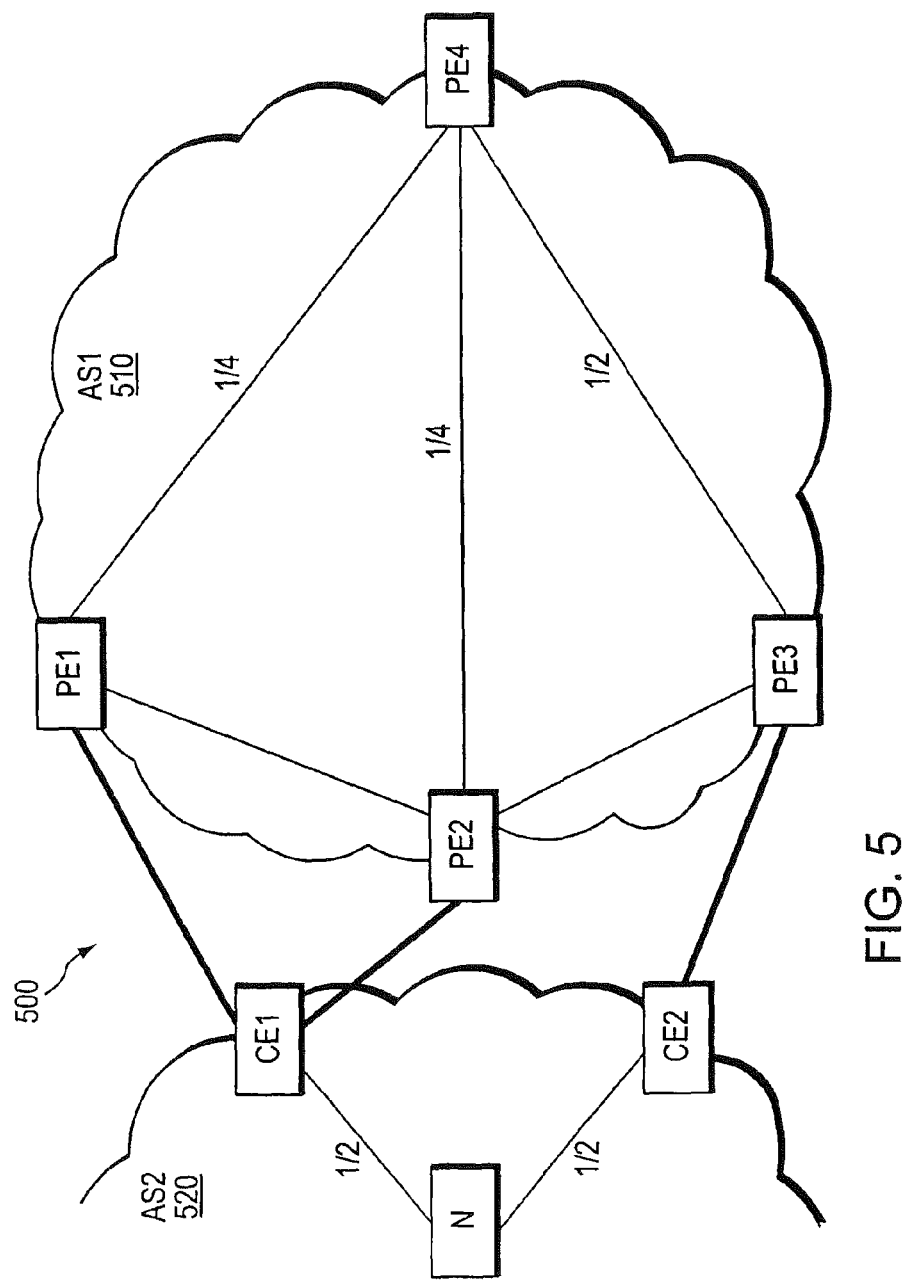
FIG. 5 is a schematic block diagram of an exemplary computer network in which the inventive dynamic SRNG discovery technique may be used to optimize load-balancing of network traffic.

The dynamic SRNG discovery technique may be employed in a variety of different applications. In one illustrative application, a PE device may automatically detect SRNG memberships in order to provide optimal load-balancing of network traffic addressed to the same customer site. For example, consider the network topology of FIG. 5 in which a computer network 500 includes a provider network 510 (AS1) coupled to a neighboring customer site 520 (AS2). The provider edge device PE4 may be configured to forward network traffic to a destination N in the customer site 520. In this exemplary topology, the destination N is reachable through both the customer edge devices CE1 and CE2. PE4 can forward network traffic to CE1 through either PE1 or PE2, or PE4 can direct traffic to CE2 via PE3. Accordingly, PE4 has three possible routes to forward data addressed to the destination N.

Using conventional "round robin" load-balancing protocols, PE4 would distribute network traffic addressed to the destination N equally among the three possible routes. That is, PE1, PE2 and PE3 would each receive ⅓ of the traffic. However, such a round-robin approach does not equally distribute traffic at CE1 and CE2, since CE1 would receive ⅔ of the traffic (⅓ from PE1 and ⅓ from PE2), whereas CE2 would only receive ⅓ of the traffic. More optimal load balancing may be realized when PE4 dynamically determines the SRNG memberships of PE1, PE2 and PE3, in accordance with the present invention. In this case, PE4 can automatically detect that PE1 and PE2 belong to the same SRNG, and thus may distribute network traffic in a manner that ensures that both CE1 and CE2 receive equal amounts of traffic addressed to the destination N (as shown).

In yet another illustrative application, the dynamic SRNG discovery technique of the present invention may be utilized when selecting a backup PE device for fast reroute (FRR) at the edge of a RFC-2547 network. An example of such a backup PE selection algorithm is described in U.S. patent application Ser. No. 11/084,838, entitled ALGORITHM FOR BACKUP PE SELECTION, filed Mar. 18, 2005, by Clarence Filsfils et al., and now issued as U.S. Pat. No. 7,535, 828, which application is expressly incorporated by reference as though fully set forth herein. Accordingly, the value of a SRNG metric may be associated with at least some of the fully-meshed PE devices based on the results of the dynamic SRNG discovery technique described herein. Thereafter, the SRNG metrics may be input to an appropriate backup PE selection algorithm. Of course, those skilled in the art will appreciate that the dynamic SRNG system and method of the present invention also may be useful in other applications not explicitly described herein.

Advantageously, the inventive dynamic SRNG discovery technique enables faster and more efficient identification of SRNG memberships. The technique also enables SRNG memberships to be updated faster and more efficiently in response to network topology changes. For example, iBGP messages 160 containing updated CE-identifier information may be disseminated among the fully-meshed PE devices to quickly communicate changes in CE device reachability. In response to receiving such an update, a PE device can update the contents of its BGP table 300, thereby providing an up-to-date view of SRNG memberships in the provider network.

The foregoing has been a detailed description of illustrative embodiments of the invention. Various modifications and additions can be made without departing from the spirit and scope of the invention. For example, while the inventive dynamic SRNG discovery technique has been illustratively described with respect to MPLS/VPN networks, it is also expressly contemplated that the invention may be deployed in other types of networks and subnetworks, such as autonomous systems, broadcast domains, routing areas, etc., that implement various network communication protocols. Moreover, where the illustrative embodiments describe devices that are "attached," those skilled in the art will understand that the devices may be physically and/or logically coupled to one another, e.g., by BGP communication sessions or the like.

It is expressly contemplated that the teachings of this invention can be implemented as software, including a computer-readable medium having program instructions executing on a computer, hardware, firmware, or a combination thereof. For instance, the invention may be implemented by a PE device 200 having one or more processors, some of which may reside on the network interfaces 210 or on line cards containing the network interfaces. Further, the memory 240 may be distributed among a plurality of different memory elements, both local and remote to the PE device 200. The inventive technique therefore may be implemented in various combinations of hardware and/or software. Accordingly, this description is meant to be taken only by way of example and not to otherwise limit the scope of the invention.

What is claimed is:

1. A method comprising:
    determining an identity of each peer device in a second routing domain attached to an edge device in a first routing domain and one or more nodes in the second routing domain, wherein the edge device is configured to identify one or more shared risk node groups (SRNG) corresponding to one or more peer devices in the second routing domain;
    receiving, from other edge devices in the first routing domain, identities of peer devices in the second routing domain attached to the other edge devices;
    associating, by the edge device in the first routing domain, each address prefix of the one or more nodes in the second routing domain with an identity of each peer device in the second routing domain that advertised the address prefix and with an identity of one or more edge devices in the first routing domain to which that peer device is attached, wherein the address prefix is advertised using at least one protocol selected from the group comprising Border Gateway Protocol (BGP), Open Shortest Path First (OSPF), and Intermediate-System-to-Intermediate-System (IS-IS);
    determining, by the edge device in the first routing domain, a specific address prefix is associated with a same identity of a peer device in the second routing domain but with different edge devices in the first routing domain; and
    assigning the different edge devices in the first routing domain associated with the specific address prefix to a shared risk node group (SRNG) corresponding to the peer device in the second routing domain.

2. The method of claim 1, wherein the determining an identity further comprises:
    establishing a gateway protocol session over a link between the edge device in the first routing domain and each peer device in the second routing domain; and
    receiving the identity of each peer device in the second routing domain in a message transmitted in the respective session.

3. The method of claim 2, wherein the gateway protocol session is a border gateway protocol (BGP) session, and the message is a BGP Open message having a BGP Identifier field that indicates the identity.

4. The method of claim 2, wherein the gateway protocol session is an interior gateway protocol (IGP) session, and the message is an IGP Hello message having a Router Identifier (ID) field that indicates the identity.

5. The method of claim 1, wherein the receiving identities further comprises:
    receiving one or more advertisements from the other edge devices in the first routing domain that include one or more address prefixes of the one or more nodes in the second routing domain and identities of peer devices in the second routing domain through which the one or more address prefixes are reachable.

6. The method of claim 5, wherein the one or more advertisements are interior border gateway protocol (iBGP) messages that include a peer-router extended community attribute.

7. The method of claim 1, wherein the associating further comprises:
    constructing a plurality of table entries, each table entry to indicate a particular address prefix of one or more nodes in the second routing domain, an identity of a particular peer device in the second routing domain that advertised the address prefix, and an identity of a particular edge device in the first routing domain to which that peer device is attached.

8. The method of claim 7, wherein the determining an address prefix is associated with a same identity of a peer device in the second routing domain but with different edge devices further comprises:
    walking the table entries to determine a subset of the table entries that indicate a same particular address prefix and a same particular peer device but that indicate different edge devices.

9. The method of claim 1, further comprising:
    load balancing traffic based on the assignment of the different edge devices to the SRNG.

10. The method of claim 1, further comprising:
    selecting a backup edge device in the first routing domain based on the assignment of the different edge devices to the SRNG.

11. The method of claim 1, wherein the determining an identity and the receiving identities are also performed by the network device, and the network device is the edge device in the first routing domain.

12. An apparatus, comprising:
    one or more network interfaces coupled to a plurality of edge devices in a first routing domain;
    a memory configured to store instructions which are executable by the processor to:
        determine an identity of each peer device in a second routing domain attached to edge devices in the first routing domain and one or more nodes in the second routing domain, wherein each of the edge devices is configured to identify one or more shared risk node groups (SRNG) in the first routing domain corresponding to one or more peer devices in the second routing domain,
        associate each address prefix of the one or more nodes in the second routing domain with an identity of each peer device in the second routing domain that advertised the address prefix and with an identity of one or more edge devices in the first routing domain to which that peer device is attached, wherein the address prefix is advertised using at least one protocol selected from the group comprising Border Gateway Protocol (BGP), Open Shortest Path First (OSPF), and Intermediate-System-to-Intermediate-System (IS-IS),
        determine an address prefix is associated with a same identity of a peer device in the second routing domain but with different edge devices in the first routing domain, and
        assign the different edge devices in the first routing domain associated with the determined address prefix to a shared risk node group (SRNG).

13. The apparatus of claim 12, wherein the instructions which are executable by the processor to determine an identity of each peer device comprise instructions executable by the processor to:
    establish a gateway protocol session to one or more peer devices in the second routing domain; and
    determine the identity of each of the one or more peer devices in the second routing domain from a message transmitted over a respective session.

14. The apparatus of claim 13, wherein the gateway protocol session is a border gateway protocol (BGP) session, and the message is a BGP Open message.

15. The apparatus of claim 13, wherein the gateway protocol session is an interior gateway protocol (IGP) session, and the message is an IGP Hello message.

16. The apparatus of claim 12, wherein the instructions which are executable by the processor to determine an identity of each peer device comprise instructions executable by the processor to:

process one or more advertisements received from the edge devices in the first routing domain that include one or more address prefixes of the one or more nodes in the second routing domain and identities of peer devices in the second routing domain through which the one or more address prefixes are reachable.

17. The apparatus of claim 16, wherein the one or more advertisements are interior border gateway protocol (iBGP) messages.

18. The apparatus of claim 12, wherein the instructions which are executable by the processor to associate comprise instructions executable by the processor to:

construct a plurality of table entries, each table entry to indicate a particular address prefix of the one or more nodes in the second routing domain, an identity of a particular peer device in the second routing domain that advertised the address prefix, and an identity of a particular edge device in the first routing domain to which that peer device is attached.

19. The apparatus of claim 12, wherein the instructions which are executable by the processor to associate comprise instructions executable by the processor to:

determine an address prefix is associated with a same identity of a peer device in the second routing domain but with different edge devices comprise instructions executable by the processor to:

walk the table entries to determine a subset of the table entries that indicate a same particular address prefix and a same particular peer device but that indicate different edge devices.

20. An apparatus, comprising:

one or more network interfaces coupled to a plurality of edge devices in a first routing domain;

means for determining an identity of each peer device in a second routing domain attached to edge devices in the first routing domain and one or more nodes in the second routing domain, wherein each of the edge devices is configured to identify one or more shared risk node groups (SRNG) in the first routing domain corresponding to one or more peer devices in the second routing domain;

means for associating each address prefix of the one or more nodes in the second routing domain with an identity of each peer device in the second routing domain that advertised the address prefix and with an identity of one or more edge devices in the first routing domain to which that peer device is attached, wherein the address prefix is advertised using at least one protocol selected from the group comprising Border Gateway Protocol (BGP), Open Shortest Path First (OSPF), and Intermediate-System-to-Intermediate-System (IS-IS);

means for determining an address prefix is associated with a same identity of a peer device in the second routing domain but with different edge devices in the first routing domain; and means for assigning the different edge devices in the first routing domain associated with the determined address prefix to a shared risk node group (SRNG).

* * * * *